(12) United States Patent
Hirano (10) Patent No.: US 9,780,679 B2
(45) Date of Patent: Oct. 3, 2017

(54) POWER CONVERSION DEVICE AND POWER CONVERSION METHOD

(71) Applicant: TOYOTA JIDOSHA KABUSHIKI KAISHA, Toyota-shi, Aichi-ken (JP)

(72) Inventor: Takahiro Hirano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 408 days.

(21) Appl. No.: 14/625,726

(22) Filed: Feb. 19, 2015

(65) Prior Publication Data

US 2015/0244278 A1 Aug. 27, 2015

(30) Foreign Application Priority Data

Feb. 21, 2014 (JP) .................. 2014-032168

(51) Int. Cl.
*H02P 21/06* (2016.01)
*H02M 3/335* (2006.01)
*B60L 11/18* (2006.01)

(52) U.S. Cl.
CPC ..... *H02M 3/33584* (2013.01); *B60L 11/1812* (2013.01); *H02M 3/33561* (2013.01); *B60L 2210/30* (2013.01); *B60L 2210/40* (2013.01); *B60L 2240/526* (2013.01); *B60L 2240/527* (2013.01); *B60L 2240/529* (2013.01); *B60L 2240/547* (2013.01); *B60L 2240/549* (2013.01); *Y02T 10/7005* (2013.01);
(Continued)

(58) Field of Classification Search
CPC .......... H02M 3/33584; H02M 3/33561; B60L 11/1812; B60L 2210/30; B60L 2210/40; B60L 2240/526; B60L 2240/527; B60L 2240/529; B60L 2240/547; B60L 2240/549; Y02T 10/7005; Y02T 10/7072; Y02T 10/7241; Y02T 90/127; Y02T 90/14; Y10T 307/352
USPC ....................................... 307/11–42
See application file for complete search history.

(56) References Cited

U.S. PATENT DOCUMENTS 7,234,159 B1 * 6/2007 Fox .................. G06F 21/76
726/20
7,560,872 B2 * 7/2009 Lyle, Jr. ............. H05B 41/3927
315/220

(Continued)

FOREIGN PATENT DOCUMENTS

JP 2011-193713 A 9/2011

*Primary Examiner* — Brandon S Cole
(74) *Attorney, Agent, or Firm* — Andrews Kurth Kenyon LLP (57) ABSTRACT

There is provided a power conversion method of a power conversion device including a plurality of primary side ports disposed in a primary side circuit and a secondary side port disposed in a secondary side circuit magnetically coupled to the primary side circuit using a transformer, the power conversion device adjusting transmitted power transmitted between the primary side circuit and the secondary side circuit, and a duty ratio of the switching of the primary side circuit or a duty ratio of the switching of the secondary side circuit being changed, including fixing the first duty ratio or the second duty ratio to the third duty ratio when the phase difference is the upper limit value and the detected voltage of the first primary side port is less than the product of the target voltage of the second primary side port and 100/the third duty ratio.

14 Claims, 6 Drawing Sheets

(52) U.S. Cl.
CPC ........ *Y02T 10/7072* (2013.01); *Y02T 10/7241* (2013.01); *Y02T 90/127* (2013.01); *Y02T 90/14* (2013.01); *Y10T 307/352* (2015.04)

(56) References Cited

U.S. PATENT DOCUMENTS

| | | | |
|---|---|---|---|
| 7,830,686 B2* | 11/2010 | Zeng ..................... | H02M 3/285 |
| | | | 363/69 |
| 9,425,693 B2* | 8/2016 | Wang .................... | H02M 3/285 |
| 9,537,414 B2* | 1/2017 | Miura ............... | H02M 3/33561 |
| 9,627,986 B2* | 4/2017 | Muto ................ | H02M 3/33584 |
| 2003/0098861 A1* | 5/2003 | Nakatsuka ......... | H05B 41/2827 |
| | | | 345/212 |
| 2008/0062724 A1* | 3/2008 | Feng ........................ | H02J 7/35 |
| | | | 363/17 |
| 2010/0248050 A1* | 9/2010 | Hu .................... | H01M 8/04626 |
| | | | 429/428 |
| 2011/0198933 A1* | 8/2011 | Ishigaki ................. | B60R 25/00 |
| | | | 307/66 |

* cited by examiner

POWER CONVERSION DEVICE AND POWER CONVERSION METHOD

INCORPORATION BY REFERENCE

The disclosure of Japanese Patent Application No. 2014-032168 filed on Feb. 21, 2014 including the specification, drawings and abstract is incorporated herein by reference in its entirety.

BACKGROUND OF THE INVENTION

1. Field of the Invention

The invention relates to a power conversion device and a power conversion method.

2. Description of Related Art

There is a conventional power conversion device that adjusts transmitted power transmitted between a primary side conversion circuit that includes a plurality of primary side ports and a secondary side conversion circuit that includes a plurality of secondary side ports and is magnetically coupled to the primary side conversion circuit using a transformer in accordance with a phase difference $\phi$ (see, e.g., Japanese Patent Application Publication No. 2011-193713 (JP 2011-193713 A)).

The transmitted power adjusted in accordance with the phase difference $\phi$ is also influenced by the value of a duty ratio D of switching of the primary side conversion circuit or the secondary side conversion circuit.

However, since the phase difference $\phi$ and the duty ratio D are controlled independently of each other, even when the phase difference $\phi$ is set to a value that maximizes the transmitted power, in the case where the duty ratio D is not set properly, there is a possibility that the transmitted power is reduced.

SUMMARY OF THE INVENTION

To cope with this, an aspect of the invention prevents the reduction of the transmitted power from the maximum value.

In order to achieve the above object, according to the aspect, there is provided a power conversion method of a power conversion device including a plurality of primary side ports disposed in a primary side circuit and a secondary side port disposed in a secondary side circuit magnetically coupled to the primary side circuit with a transformer, the power conversion device adjusting transmitted power by changing a phase difference between switching of the primary side circuit and switching of the secondary side circuit, the transmitted power being transmitted between the primary side circuit and the secondary side circuit and adjusted, and a first duty ratio of the switching of the primary side circuit or a second duty ratio of the switching of the secondary side circuit being changed, power the conversion method including: determining whether the phase difference is an upper limit value; determining whether a detected voltage of a first primary side port is less than a product of a target voltage of a second primary side port and 100/a third duty ratio, the third duty ratio being more than 0 and less than 100, the third duty ratio being the first duty ratio of the switching of the primary side circuit (20) when the transmitted power is maximized or the second duty ratio of the switching of the secondary side circuit (30) when the transmitted power is maximized; and fixing the first duty ratio or the second duty ratio to the third duty ratio when the phase difference is the upper limit value and the detected voltage of the first primary side port is less than the product of the target voltage of the second primary side port and 100/the third duty ratio.

According to the aspect, it is possible to prevent the reduction of the transmitted power from the maximum value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Power Supply Apparatus 101

Figure 1:
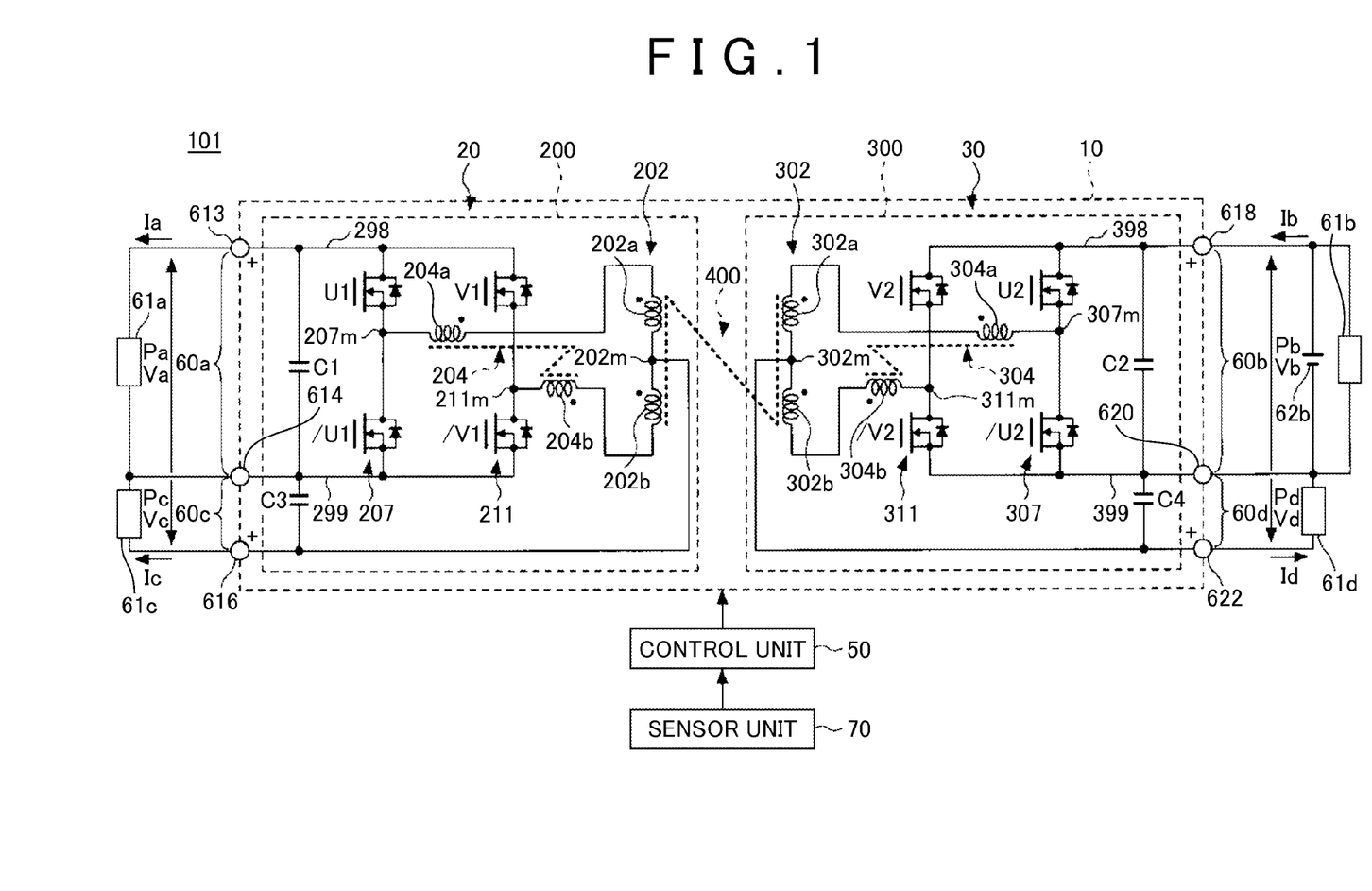
FIG. 1 is a block diagram showing an example of the configuration of a power supply apparatus as an embodiment of a power conversion device.

FIG. 1 is a block diagram showing an example of the configuration of a power supply apparatus 101 as an embodiment of a power conversion device. The power supply apparatus 101 is, e.g., a power supply system that includes a power supply circuit 10, a control unit 50, and a sensor unit 70. The power supply apparatus 101 is a system that is mounted on, e.g., a vehicle such as an automobile or the like and supplies power to individual loads mounted on the vehicle. Specific examples of such a vehicle include a hybrid car, a plug-in hybrid car, and an electric car.

The power supply apparatus 101 has, e.g., a first input/output port 60a to which a primary side high-voltage load (e.g., an electric power steering apparatus (EPS) or the like) 61a is connected, and a second input/output port 60c to which a primary side low-voltage load (e.g., an electronic control unit (ECU), an electronically controlled brake system (ECB), or the like) 61c is connected as primary side ports.

The power supply apparatus 101 has, e.g., a third input/output port 60b to which a secondary side high-voltage load 61b and a secondary side high-voltage power supply 62b (e.g., a main equipment battery) are connected, and a fourth input/output port 60d to which a secondary side low-voltage load 61d is connected as secondary side ports. The secondary side high-voltage power supply 62b supplies power to the secondary side high-voltage load 61b that operates at the same voltage system as that of the secondary side high-voltage power supply 62b (e.g., a 288 V system higher than a 12 V system and a 48 V system). In addition, the secondary side high-voltage power supply 62b supplies power of which the voltage is reduced by a secondary side conversion circuit 30 disposed in the power supply circuit 10 to the secondary side low-voltage load 61d that operates at the voltage system different from that of the secondary side high-voltage power supply 62b (e.g., a 72 V system lower than the 288 V system). A specific example of the secondary side high-voltage power supply 62b includes a secondary battery such as a lithium-ion battery or the like.

The power supply circuit 10 is a power conversion circuit that has the four input/output ports described above, and has a function of performing power conversion between any two input/output ports selected from the four input/output ports. Note that the power supply apparatus 101 including the power supply circuit 10 may also be an apparatus that has at least three or more input/output ports, and is capable of converting power between any two input/output ports of at least three or more input/output ports. For example, the power supply circuit 10 may be a circuit that has three input/output ports without having the fourth input/output port 60d.

Port powers Pa, Pc, Pb, and Pd are input/output powers (an input power or an output power) in the first input/output port 60a, the second input/output port 60c, the third input/output power 60b, and the fourth input/output port 60d. Port voltages Va, Vc, Vb, and Vd are input/output voltages (an input voltage or an output voltage) in the first input/output port 60a, the second input/output port 60c, the third input/output power 60b, and the fourth input/output port 60d. Port currents Ia, Ic, Ib, and Id are input/output currents (an input current or an output current) in the first input/output port 60a, the second input/output port 60c, the third input/output power 60b, and the fourth input/output port 60d.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Specific examples of the capacitors C1, C2, C3, and C4 include a film capacitor, an aluminum electrolytic capacitor, a ceramic capacitor, and a solid polymer capacitor.

The capacitor C1 is inserted between a terminal 613 on the high potential side of the first input/output port 60a and a terminal 614 on the low potential side of the first input/output port 60a and the second input/output port 60c. The capacitor C3 is inserted between a terminal 616 on the high potential side of the second input/output port 60c and the terminal 614 on the low potential side of the first input/output port 60a and the second input/output port 60c. The capacitor C2 is inserted between a terminal 618 on the high potential side of the third input/output port 60b and a terminal 620 on the low potential side of the third input/output port 60b and the fourth input/output port 60d. The capacitor C4 is inserted between a terminal 622 on the high potential side of the fourth input/output port 60d and the terminal 620 on the lower potential side of the third input/output port 60b and the fourth input/output port 60d.

The capacitors C1, C2, C3, and C4 may be provided inside the power supply circuit 10 or outside the power supply circuit 10.

The power supply circuit 10 is a power conversion circuit configured to include a primary side conversion circuit 20 and the secondary side conversion circuit 30. Note that the primary side conversion circuit 20 and the secondary side conversion circuit 30 are connected to each other via a primary side magnetic coupling reactor 204 and a secondary side magnetic coupling reactor 304, and are magnetically coupled to each other using a transformer 400 (a center tap transformer). The primary side ports including the first input/output port 60a and the second input/output port 60c and the secondary side ports including the third input/output port 60b and the fourth input/output port 60d are connected to each other via the transformer 400.

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm/U1, a primary side second upper arm V1, and a primary side second lower arm/V1. Herein, each of the primary side first upper arm U1, the primary side first lower arm/U1, the primary side second upper atm V1, and the primary side second lower arm/V1 is a switching element configured to include, e.g., an N-channel metal-oxide-semiconductor field-effect transistor (MOSFET) and a body diode as a parasitic element of the MOSFET. A diode may be additionally connected in parallel to the MOSFET.

The primary side full bridge circuit 200 has a primary side positive electrode bus 298 connected to the terminal 613 on the high potential side of the first input/output port 60a, and a primary side negative electrode bus 299 connected to the terminal 614 on the low potential side of the first input/output port 60a and the second input/output port 60c.

A primary side first arm circuit 207 in which the primary side first upper arm U1 and the primary side first lower arm/U1 are connected in series is attached between the primary side positive electrode bus 298 and the primary side negative electrode bus 299. The primary side first arm circuit 207 is a primary side first power conversion circuit unit (a primary side U-phase power conversion circuit unit) capable of a power conversion operation using an ON/OFF switching operation of each of the primary side first upper arm U1 and the primary side first lower arm/U1. Further, a primary side second arm circuit 211 in which the primary side second upper arm V1 and the primary side second lower arm/V1 are connected in series is attached in parallel with the primary side first arm circuit 207 between the primary side positive electrode bus 298 and the primary side negative electrode bus 299. The primary side second arm circuit 211 is a primary side second power conversion circuit unit (a primary side V-phase power conversion circuit unit) capable of the power conversion operation using the ON/OFF switching operation of each of the primary side second upper arm V1 and the primary side second lower arm/V1.

In a bridge portion that connects a middle point 207m of the primary side first arm circuit 207 and a middle point 211m of the primary side second arm circuit 211, the primary side coil 202 and the primary side magnetic coupling reactor 204 are provided. More specifically describing the connection relationship of the bridge portion, one end of a primary side first reactor 204a of the primary side magnetic coupling reactor 204 is connected to the middle point 207m of the primary side first arm circuit 207. In addition, one end of the primary side coil 202 is connected to the other end of the primary side first reactor 204a. Further, one end of a primary side second reactor 204b of the primary side magnetic coupling reactor 204 is connected to the other end of the primary side coil 202. Furthermore, the other end of the primary side second reactor 204b is connected to the middle point 211m of the primary side, second arm circuit 211. Note that the primary side magnetic coupling reactor 204 is configured to include the primary side first reactor 204a and the primary side second reactor 204b magnetically coupled to the primary side first reactor 204a with a coupling coefficient k1.

The middle point 207m is a primary side first intermediate node between the primary side first upper arm U1 and the primary side first lower arm/U1, and the middle point 211m is a primary side second intermediate node between the primary side second upper arm V1 and the primary side second lower arm/V1.

The first input/output port 60a is a port provided between the primary side positive electrode bus 298 and the primary side negative electrode bus 299. The first input/output port 60a is configured to include the terminal 613 and the terminal 614. The second input/output port 60c is a port provided between the primary side negative electrode bus 299 and a center tap 202m of the primary side coil 202. The second input/output port 60c is configured to include the terminal 614 and the terminal 616.

The center tap 202m is connected to the terminal 616 on the high potential side of the second input/output port 60c. The center tap 202m is an intermediate connection point of a primary side first winding 202a and a primary side second winding 202b disposed in the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm/U2, a secondary side second upper arm V2, and a secondary side second lower arm/V2. Herein, each of the secondary side first upper arm U2, the secondary side first lower arm/U2, the secondary side second upper arm V2, and the secondary side second lower arm/V2 is the switching element configured to include the N-channel MOSFET and the body diode as the parasitic element of the MOSFET. A diode may be additionally connected in parallel to the MOSFET.

The secondary side full bridge circuit 300 has a secondary side positive electrode bus 398 connected to the terminal 618 on the high potential side of the third input/output port 60b and a secondary side negative electrode bus 399 connected to the terminal 620 on the low potential side of the third input/output port 60b and the fourth input/output port 60d.

A secondary side first arm circuit 307 in which the secondary side first upper arm U2 and the secondary side first lower arm/U2 are connected in series is attached between the secondary side positive electrode bus 398 and the secondary side negative electrode bus 399. The secondary side first arm circuit 307 is a secondary side first power conversion circuit unit (a secondary side U-phase power conversion circuit unit) capable of the power conversion operation using the ON/OFF switching operation of each of the secondary side first upper arm U2 and the secondary side first lower arm/U2. Further, a secondary side second arm circuit 311 in which the secondary side second upper arm V2 and the secondary side second lower arm/V2 are connected in series is attached in parallel with the secondary side first arm circuit 307 between the secondary side positive electrode bus 398 and the secondary side negative electrode bus 399. The secondary side second arm circuit 311 is a secondary side second power conversion circuit unit (a secondary side V-phase power conversion circuit unit) capable of the power conversion operation using the ON/OFF switching operation of each of the secondary side second upper arm V2 and the secondary side second lower arm/V2.

In a bridge portion that connects a middle point 307m of the secondary side first arm circuit 307 and a middle point 311m of the secondary side second arm circuit 311, the secondary side coil 302 and the secondary side magnetic coupling reactor 304 are provided. More specifically describing the connection relationship of the bridge portion, one end of a secondary side first reactor 304a of the secondary side magnetic coupling reactor 304 is connected to the middle point 307m of the secondary side first arm circuit 307. In addition, one end of the secondary side coil 302 is connected to the other end of the secondary side first reactor 304a. Further, one end of a secondary side second reactor 304b of the secondary side magnetic coupling reactor 304 is connected to the other end of the secondary side coil 302. Furthermore, the other end of the secondary side second reactor 304b is connected to the middle point 311m of the secondary side second arm circuit 311. Note that the secondary side magnetic coupling reactor 304 is configured to include the secondary side first reactor 304a and the secondary side second reactor 304b magnetically coupled to the secondary side first reactor 304a with a coupling coefficient k2.

The middle point 307m is a secondary side first intermediate node between the secondary side first upper arm U2 and the secondary side first lower arm/U2, and the middle point 311m is a secondary side second intermediate node between the secondary side second upper arm V2 and the secondary side second lower arm/V2.

The third input/output port 60b is a port provided between the secondary side positive electrode bus 398 and the secondary side negative electrode bus 399. The third input/output port 60b is configured to include the terminal 618 and the terminal 620. The fourth input/output port 60d is a port provided between the secondary side negative electrode bus 399 and a center tap 302m of the secondary side coil 302. The fourth input/output port 60d is configured to include the terminal 620 and the terminal 622.

The port voltage Vb of the third input/output port 60b and the port voltage Vd of the fourth input/output port 60d fluctuate depending on the voltage of the secondary side high-voltage power supply 62b.

The center tap 302m is connected to the terminal 622 on the high potential side of the fourth input/output port 60d. The center tap 302m is an intermediate connection point of a secondary side first winding 302a and a secondary side second winding 302b disposed in the secondary side coil 302.

In FIG. 1, the power supply apparatus 101 includes a sensor unit 70. The sensor unit 70 is detection means for detecting an input/output value Y in at least one of the first to fourth input/output ports 60a, 60c, 60b, and 60d at a predetermined detection period and outputting a detected value Yd corresponding to the detected input/output value Y to the control unit 50. The detected value Yd may be a detected voltage obtained by detecting the input/output voltage, a detected current obtained by detecting the input/output current, or detected power obtained by detecting the input/output power. The sensor unit 70 may be provided inside the power supply circuit 10 or outside the power supply circuit 10.

The sensor unit 70 has, e.g., a voltage detection unit that detects the input/output voltage generated in at least one of the first to fourth input/output ports 60a, 60c, 60b, and 60d. The sensor unit 70 has, e.g., a primary side voltage detection unit that outputs the detected voltage of at least one of the input/output voltage Va and the input/output voltage Vc as a primary side voltage detected value, and a secondary side voltage detection unit that outputs the detected voltage of at least one of the input/output voltage Vb and the input/output voltage Vd as a secondary side voltage detected value.

The voltage detection unit of the sensor unit 70 has, e.g., a voltage sensor that monitors the input/output voltage value of at least one port, and a voltage detection circuit that outputs the detected voltage corresponding to the input/output voltage value monitored by the voltage sensor to the control unit 50.

The sensor unit 70 has, e.g., a current detection unit that detects the input/output current flowing in at least one of the first to fourth input/output ports 60*a*, 60*c*, 60*b*, and 60*d*. The sensor unit 70 has, e.g., a primary side current detection unit that outputs the detected current of at least one of the input/output current Ia and the input/output current Ic as a primary side current detected value, and a secondary side current detection unit that outputs the detected current of at least one of the input/output current Ib and the input/output current Id as a secondary side current detected value.

The current detection unit of the sensor unit 70 has, e.g., a current sensor that monitors the input/output current value of at least one port, and a current detection circuit that outputs the detected current corresponding to the input/output current value monitored by the current sensor to the control unit 50.

The power supply apparatus 101 includes the control unit 50. The control unit 50 is, e.g., an electronic circuit that includes a microcomputer having a central processing unit (CPU). The control unit 50 may be provided inside the power supply circuit 10 or outside the power supply circuit 10.

The control unit 50 performs feedback control on the power conversion operation executed in the power supply circuit 10 by changing the value of a predetermined control parameter X to thereby be able to adjust the input/output value Y in each of the first to fourth input/output ports 60*a*, 60*c*, 60*b*, and 60*d* of the power supply circuit 10. Examples of the main control parameter X include two types of control variables of a phase difference φ and a duty ratio D (ON time δ).

The phase difference φ is a lag in switching timing (a time lag) between the power conversion circuit units having the same phase of the primary side full bridge circuit 200 and the secondary side full bridge circuit 300. The duty ratio D (the ON time δ) is the duty ratio (the ON time) of the switching waveform in each of the power conversion circuit units disposed in the primary side full bridge circuit 200 and the secondary side full bridge circuit 300.

These two control parameters X can be controlled independently of each other. The control unit 50 changes the input/output value Y in each input/output port of the power supply circuit 10 by duty ratio control and/or phase control of the primary side full bridge circuit 200 and the secondary side full bridge circuit 300 that use the phase difference φ and the duty ratio D (the ON time δ).

The control unit 50 performs the feedback control on the power conversion operation by the power supply circuit 10 such that the phase difference φ or the duty ratio D changes to a value that allows the detected value Yd of the input/output value Y in at least one of the first to fourth input/output ports 60*a*, 60*c*, 60*b*, and 60*d* to converge to a target value Yo set for the port. The target value Yo is, a command value that is set by the control unit 50 or a predetermined apparatus other than the control unit 50 based on, e.g., a drive condition determined for each of the loads (e.g., the primary side low-voltage load 61*c* and the like) connected to the each of the input/output ports. The target value Yo functions as an output target value when power is output from the port, functions as an input target value when power is input to the port, and may be a target voltage value, a target current value, or a target power value.

In addition, the control unit 50 performs the feedback control on the power conversion operation by the power supply circuit 10 such that the phase difference φ changes to a value that allows transmitted power P transmitted via the transformer 400 between the primary side conversion circuit 20 and the secondary side conversion circuit 30 to converge to set target transmitted power. The transmitted power is also referred to as a power transmission amount. The target transmitted power is, e.g., a command value that is set by the control unit 50 or a predetermined apparatus other than the control unit 50 based on a deviation between the detected value Yd and the target value Yo in any port.

Figure 2:
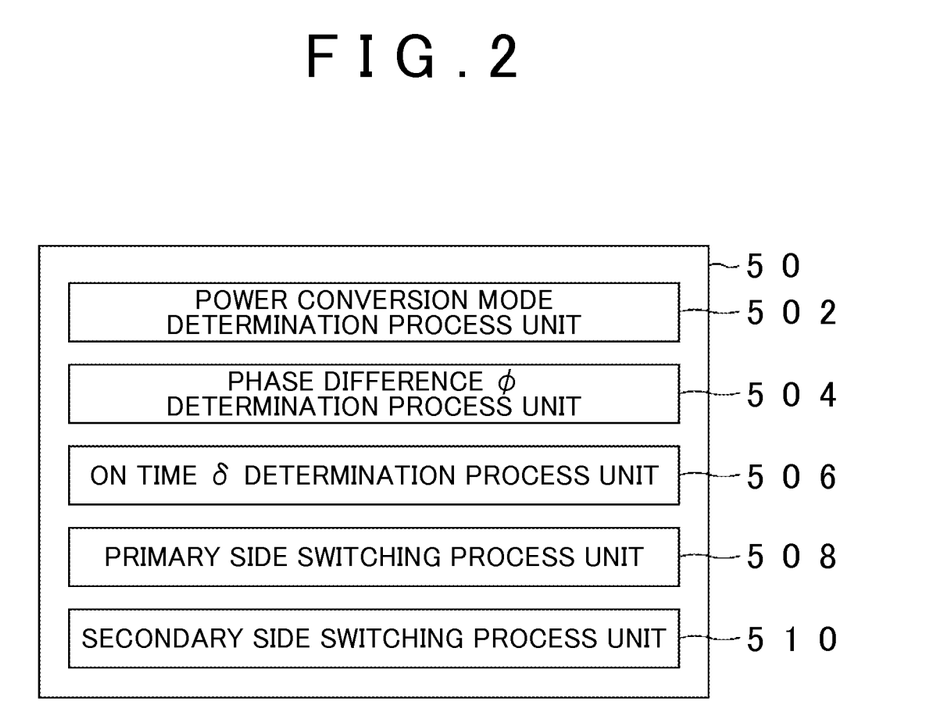
FIG. 2 is a block diagram showing an example of the configuration of a control unit.

FIG. 2 is a block diagram of the control unit 50. The control unit 50 is a control unit having a function of performing switching control of the individual switching elements such as the primary side first upper arm U1 and the like in the primary side conversion circuit 20 and the individual switching elements such as the secondary side first upper arm U2 and the like in the secondary side conversion circuit 30. The control unit 50 is configured to include a power conversion mode determination process unit 502, a phase difference φ determination process unit 504, an ON time δ determination process unit 506, a primary side switching process unit 508, and a secondary side switching process unit 510. The control unit 50 is, e.g., an electronic circuit that includes a microcomputer having a CPU.

The power conversion mode determination process unit 502 selects and determines an operation mode from the following power conversion modes A to L of the power supply circuit 10 based on a predetermined external signal (e.g., a signal indicative of a deviation between the detected value Yd and the target value Yo in any port). The power conversion mode includes a mode A in which power input from the first input/output port 60*a* is converted and output to the second input/output port 60*c*, a mode B in which power input from the first input/output port 60*a* is converted and output to the third input/output port 60*b*, and a C mode in which power input from the first input/output port 60*a* is converted and output to the fourth input/output port 60*d*.

In addition, the power conversion mode includes a mode D in which power input from the second input/output port 60*c* is converted and output to the first input/output port 60*a*, a mode E in which power input from the second input/output port 60*c* is converted and output to the third input/output port 60*b*, and a mode F in which power input from the second input/output port 60*c* is converted and output to the fourth input/output port 60*d*.

Further, the power conversion mode includes a mode G in which power input from the third input/output port 60*b* is converted and output to the first input/output port 60*a*, a mode H in which power input from the third input/output port 60*b* is converted and output to the second input/output port 60*c*, and a mode I in which power input from the third input/output port 60*b* is converted and output to the fourth input/output port 60*d*.

Furthermore, the power conversion mode includes a mode J in which power input from the fourth input/output port 60*d* is converted and output to the first input/output port 60*a*, a mode K in which power input from the fourth input/output port 60*d* is converted and output to the second input/output port 60*c*, and a mode L in which power input from the fourth input/output port 60*d* is converted and output to the third input/output port 60*b*.

The phase difference φ determination process unit 504 has a function of setting the phase difference φ of the switching periodic operation of the switching element between the primary side conversion circuit 20 and the secondary side conversion circuit 30 in order to cause the power supply circuit 10 to function as a direct current-direct current (DC-DC) converter circuit.

The ON time δ determination process unit 506 has a function of setting the On time δ of the switching elements of the primary side conversion circuit 20 and the secondary side conversion circuit 30 in order to cause each of the primary side conversion circuit 20 and the secondary side conversion circuit 30 to function as a step-up/down circuit.

The primary side switching process unit 508 has a function of performing the switching control of the switching elements including the primary side first upper arm U1, the primary side first lower arm/U1, the primary side second upper arm V1, and the primary side second lower arm/V1 based on the outputs of the power conversion mode determination process unit 502, the phase difference ϕ determination process unit 504, and the ON time δ determination process unit 506.

The secondary side switching process unit 510 has a function of performing the switching control of the switching elements including the secondary side first upper arm U2, the secondary side first lower arm/U2, the secondary side second upper arm V2, and the secondary side second lower arm/V2 based on the outputs of the power conversion mode determination process unit 502, the phase difference ϕ determination process unit 504, and the ON time δ determination process unit 506.

The control unit 50 is not limited to the processes shown in FIG. 2, and is capable of performing various processes required to control the transmitted power transmitted between the primary side conversion circuit 20 and the secondary side conversion circuit 30.

Operation of Power Supply Apparatus 101

The operation of the power supply apparatus 101 described above will be described by using FIGS. 1 and 2. For example, in the case where the external signal that requests the operation of the power conversion mode of the power supply circuit 10 in the mode F is input, the power conversion mode determination process unit 502 of the control unit 50 determines the mode F as the power conversion mode of the power supply circuit 10. At this point, the voltage input to the second input/output port 60c is increased by the step-up function of the primary side conversion circuit 20, power having the increased voltage is transmitted to the side of the third input/output port 60b by the function of the power supply circuit 10 as the DC-DC converter circuit, the voltage of the power is reduced by the step-down function of the secondary side conversion circuit 30, and the power is output from the fourth input/output port 60d.

Herein, the step-up and step-down functions of the primary side conversion circuit 20 will be described in detail. When attention is focused on the second input/output port 60c and the first input/output port 60a, the terminal 616 of the second input/output port 60c is connected to the middle point 207m of the primary side first arm circuit 207 via the primary side first winding 202a and the primary side first reactor 204a connected in series to the primary side first winding 202a. Both ends of the primary side first arm circuit 207 are connected to the first input/output port 60a, and hence it follows that the step-up/down circuit is attached between the terminal 616 of the second input/output port 60c and the first input/output port 60a.

Further, the terminal 616 of the second input/output port 60c is connected to the middle point 211m of the primary side second arm circuit 211 via the primary side second winding 202b and the primary side second reactor 204b connected in series to the primary side second winding 202b. Both ends of the primary side second arm circuit 211 are connected to the first input/output port 60a, and hence it follows that the step-up/down circuit is connected in parallel between the terminal 616 of the second input-output port 60c and the first input/output port 60a. Note that the secondary side conversion circuit 30 is a circuit that has substantially the same configuration as that of the primary side conversion circuit 20, and hence it follows that two step-up/down circuits are connected in parallel between the terminal 622 of the fourth input/output port 60d and the third input/output port 60b. Consequently, similarly to the primary side conversion circuit 20, the secondary side conversion circuit 30 has the step-up and step-down functions.

Next, the function of the power supply circuit 10 as the DC-DC converter circuit will be described in detail. When attention is focused on the first input/output port 60a and the third input/output port 60b, the primary side full bridge circuit 200 is connected to the first input/output port 60a, and the secondary side full bridge circuit 300 is connected to the third input/output port 60b. The primary side coil 202 provided in the bridge portion of the primary side full bridge circuit 200 and the secondary side coil 302 provided in the bridge portion of the secondary side full bridge circuit 300 are magnetically coupled to each other with a coupling coefficient kT, and the transformer 400 thereby functions as the center tap transformer having a winding number ratio of 1:N. Consequently, by adjusting the phase difference ϕ of the switching periodic operation of the switching elements in the primary side full bridge circuit 200 and the secondary side full bridge circuit 300, power input to the first input/output port 60a can be converted and transmitted to the third input/output port 60b, or power input to the third input/output port 60b can be converted and transmitted to the first input/output port 60a.

Figure 3:
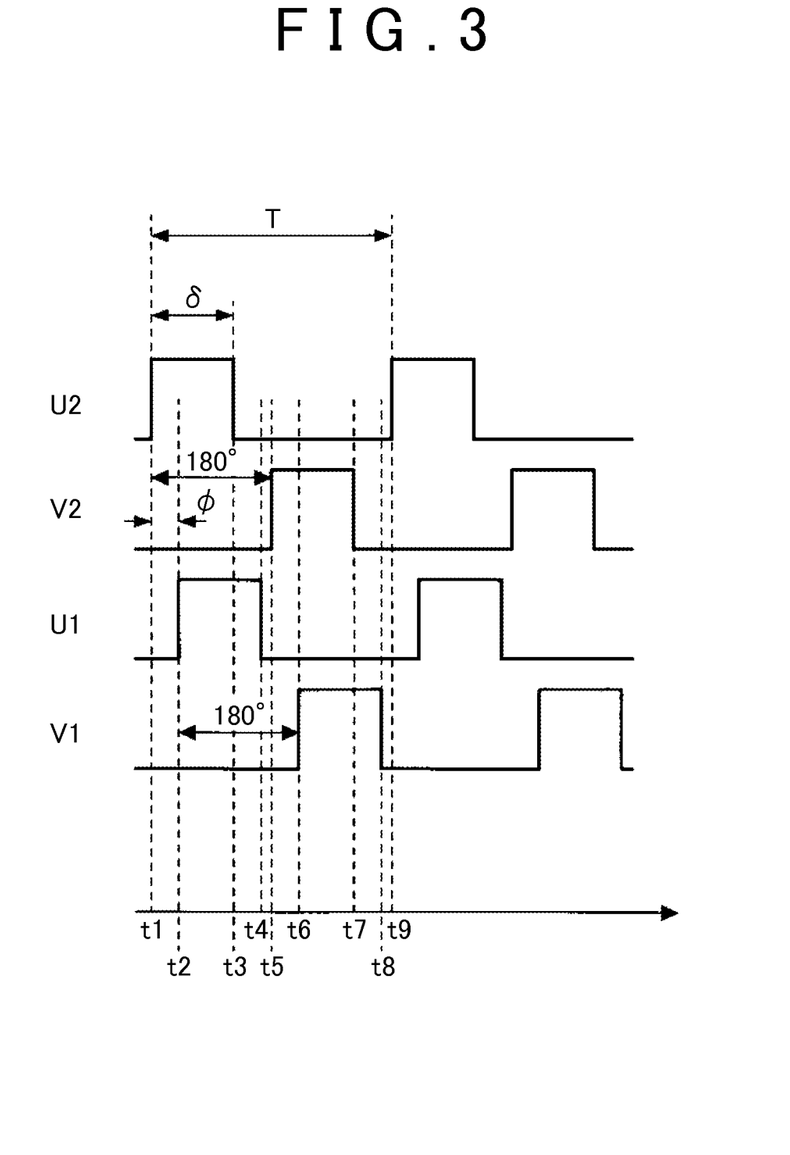
FIG. 3 is a timing chart showing an example of switching of each of a primary side circuit and a secondary side circuit.

FIG. 3 is a view showing a timing chart of a switching waveform of ON and OFF of each arm, which is produced by the control by the control unit 50, with the arms being disposed in the power supply circuit 10. In FIG. 3, U1 shows the ON/OFF waveform of the primary side first upper arm U1, V1 shows the ON/OFF waveform of the primary side second upper arm V1, U2 shows the ON/OFF waveform of the secondary side first upper arm U2, and V2 shows the ON/OFF waveform of the secondary side second upper arm V2. The ON/OFF waveforms of the primary side first lower arm/U1, the primary side second lower arm/V1, the secondary side first lower arm/U2, and the secondary side second lower arm/V2 are waveforms obtained by inverting the ON/OFF waveforms of the primary side first upper arm U1, the primary side second upper arm V1, the secondary side first upper arm U2, and the secondary side second upper arm V2 (depiction thereof is omitted). Note that dead time is preferably provided between the ON/OFF waveforms of the upper and lower arms so as to prevent both of the upper and lower arms from being turned ON and prevent a flow-through current from flowing. In addition, in FIG. 3, the high level denotes an ON state and the low level denotes an OFF state.

Herein, by changing the ON time δ of each of U1, V1, U2, and V2, it is possible to change the step-up/down ratios of the primary side conversion circuit 20 and the secondary side conversion circuit 30. For example, by equalizing the ON times δ of U1, V1, U2, and V2, it is possible to equalize the step-up/down ratio of the primary side conversion circuit 20 and the step-up/down ratio of the secondary side conversion circuit 30.

The ON time δ determination process unit 506 equalizes the individual ON times δ of U1, V1, U2, and V2 such that the step-up/down ratios of the primary side conversion circuit 20 and the secondary side conversion circuit 30 are equalized (each ON time δ=primary side ON time δ11=secondary side ON time δ12=time value β).

The step-up/down ratio of the primary side conversion circuit 20 is determined by the duty ratio D as the ratio of the ON time δ to a switching period T of the switching element (arm) disposed in the primary side full bridge circuit 200. Similarly, the step-up/down ratio of the secondary side conversion circuit 30 is determined by the duty ratio D as the ratio of the ON time δ to the switching period T of the switching element (arm) disposed in the secondary side full bridge circuit 300. The step-up/down ratio of the primary side conversion circuit 20 is a transformation ratio between the first input/output port 60a and the second input/output port 60c, and the step-up/down ratio of the secondary side conversion circuit 30 is a transformation ratio between the third input/output port 60b and the fourth input/output port 60d.

Consequently, for example, the step-up/down ratio of the primary side conversion circuit 20=the voltage of the second input/output port 60c/the voltage of the first input/output port 60a=δ11/T=β/T, and the step-up/down ratio of the secondary side conversion circuit 30=the voltage of the fourth input/output port 60d/the voltage of the third input/output port 60b=δ12/T=β/T are satisfied. That is, the step-up/down ratio of the primary side conversion circuit 20 and the step-up/down ratio of the secondary side conversion circuit 30 have the same value (=β/T).

Note that the ON time δ of FIG. 3 represents the ON time δ11 of each of the primary side first upper arm U1 and the primary side second upper arm V1, and represents the ON time δ12 of each of the secondary side first upper arm U2 and the secondary side second upper arm V2. In addition, the switching period T of the arm disposed in the primary side full bridge circuit 200 is time equal to the switching period T of the arm disposed in the secondary side full bridge circuit 300.

U1 and V1 are operated with the phase difference therebetween of 180 degrees (π), and U2 and V2 are also operated with the phase difference therebetween of 180 degrees (π). In addition, by changing the phase difference φ between U1 and U2, it is possible to adjust the power transmission amount P between the primary side conversion circuit 20 and the secondary side conversion circuit 30. When the phase difference φ>0 is satisfied, power can be transmitted from the primary side conversion circuit 20 to the secondary side conversion circuit 30 and, when the phase difference φ<0 is satisfied, power can be transmitted from the secondary side conversion circuit 30 to the primary side conversion circuit 20.

The phase difference φ is a lag in switching timing (a time lag) between the power conversion circuit units having the same phase of the primary side full bridge circuit 200 and the secondary side full bridge circuit 300. For example, the phase difference φ is a lag in switching timing between the primary side first arm circuit 207 and the secondary side first arm circuit 307, and is a lag in switching timing between the primary side second arm circuit 211 and the secondary side second arm circuit 311. These lags are controlled so as to be equal to each other. That is, the phase difference φ between U1 and U2 and the phase difference φ between V1 and V2 are controlled so as to have the same value.

Consequently, for example, in the case where the external signal that requests the operation of the power conversion mode of the power supply circuit 10 in the mode F is input, the power conversion mode determination process unit 502 determines the selection of the mode F. Subsequently, the ON time δ determination process unit 506 sets the ON time δ that specifies the step-up ratio in the case where the primary side conversion circuit 20 is caused to function as the step-up circuit that increases the voltage input to the second input/output port 60c and outputs the increased voltage to the first input/output port 60a. Note that the secondary side conversion circuit 30 functions as the step-down circuit that reduces the voltage input to the third input/output port 60b at the step-down ratio specified by the ON time δ set by the ON time δ determination process unit 506, and outputs the reduced voltage to the fourth input/output port 60d. Further, the phase difference φ determination process unit 504 sets the phase difference φ for transmitting power input to the first input/output port 60a in the desired power transmission amount P to the third input/output port 60b.

The primary side switching process unit 508 performs the switching control of the switching elements including the primary side first upper arm U1, the primary side first lower arm/U1, the primary side second upper arm V1, and the primary side second lower arm/V1 such that the primary side conversion circuit 20 is caused to function as the step-up circuit and the primary side conversion circuit 20 is caused to function as a part of the DC-DC converter circuit.

The secondary side switching process unit 510 performs the switching control of the switching elements including the secondary side first upper arm U2, the secondary side first lower arm/U2, the secondary side second upper arm V2, and the secondary side second lower arm/V2 such that the secondary side conversion circuit 30 is caused to function as the step-down circuit and the secondary side conversion circuit 30 is caused to function as a part of the DC-DC converter circuit.

As described above, it is possible to cause, each of the primary side conversion circuit 20 and the secondary side conversion circuit 30 to function as the step-up circuit or the step-down circuit, and cause the power supply circuit 10 to function as a bidirectional DC-DC converter circuit. Consequently, it is possible to perform the power conversion in all of the power conversion modes A to L and, in other words, it is possible to perform the power conversion between any two input/output ports selected from the four input/output ports.

The transmitted power P (also referred to as the power transmission amount P) that is adjusted by the control unit 50 in accordance with the phase difference φ, an equivalent inductance L, and the like is power transmitted via the transformer 400 from one of the primary side conversion circuit 20 and the secondary side conversion circuit 30 to the other one thereof, and is represented by P=(N×Va×Vb)/(π×ω×L)×F (D, φ) . . . Expression 1.

Note that N is the winding number ratio of the transformer 400, Va is the input/output voltage of the first input/output port 60a (the voltage between the primary side positive electrode bus 298 and the primary side negative electrode bus 299 of the primary side conversion circuit 20), and Vb is the input/output voltage of the third input/output port 60b (the voltage between the secondary side positive electrode bus 398 and the secondary side negative electrode bus 399 of the secondary side conversion circuit 30). π is the circular constant, and ω(=2π×f=2π/T) is an angular frequency of switching of each of the primary side conversion circuit 20 and the secondary side conversion circuit 30. π is a switching frequency of each of the primary side conversion circuit 20 and the secondary side conversion circuit 30, T is the switching period of each of the primary side conversion circuit 20 and the secondary side conversion circuit 30, and L is the equivalent inductance related to the power transmission of the magnetic coupling reactors 204 and 304 and the transformer 400. F (D, φ) is a function having the duty ratio D and the phase difference φ as variables, and is a function that monotonously increases as the phase difference φ increases without depending on the duty ratio D. Each of the duty ratio D and the phase difference φ is a control parameter that is designed so as to change in a range having predetermined upper and lower limit values.

The equivalent inductance L can be defined on a simple equivalent circuit of the transformer 400 to which the primary side magnetic coupling reactor 204 and/or the secondary side magnetic coupling reactor 304 are connected. On the simple equivalent circuit, the equivalent inductance L is a combined inductance in which the leakage inductance of the primary side magnetic coupling reactor 204 and/or the leakage inductance of the secondary side magnetic coupling reactor and the leakage inductance of the transformer 400 are combined.

For example, the equivalent inductance L measured from the side of the secondary side conversion circuit 30 (secondary side conversion value $L_{EQ2}$) can be represented by $L_{EQ2}=2L_1(1-k_1)N^2+2L_2(1-k_2)+L_{r2}(1-k_T^2)$ . . . Expression 2.

$L_1$ is the self inductance of the primary side magnetic coupling reactor 204, $k_1$ is the coupling coefficient of the primary side magnetic coupling reactor 204, N is the winding number ratio of the transformer 400, $L_2$ is the self inductance of the secondary side magnetic coupling reactor 304, $k_2$ is the coupling coefficient of the secondary side magnetic coupling reactor 304, $L_{T2}$ is an excitation inductance on the secondary side of the transformer 400, and $k_T$ is the coupling coefficient of the transformer 400. Note that, in the case where the second input/output port 60c or the fourth input-output port 60d is not used, there are cases where the leakage inductance represented by the first term or the second term in Expression 2 is not present.

Figure 4:
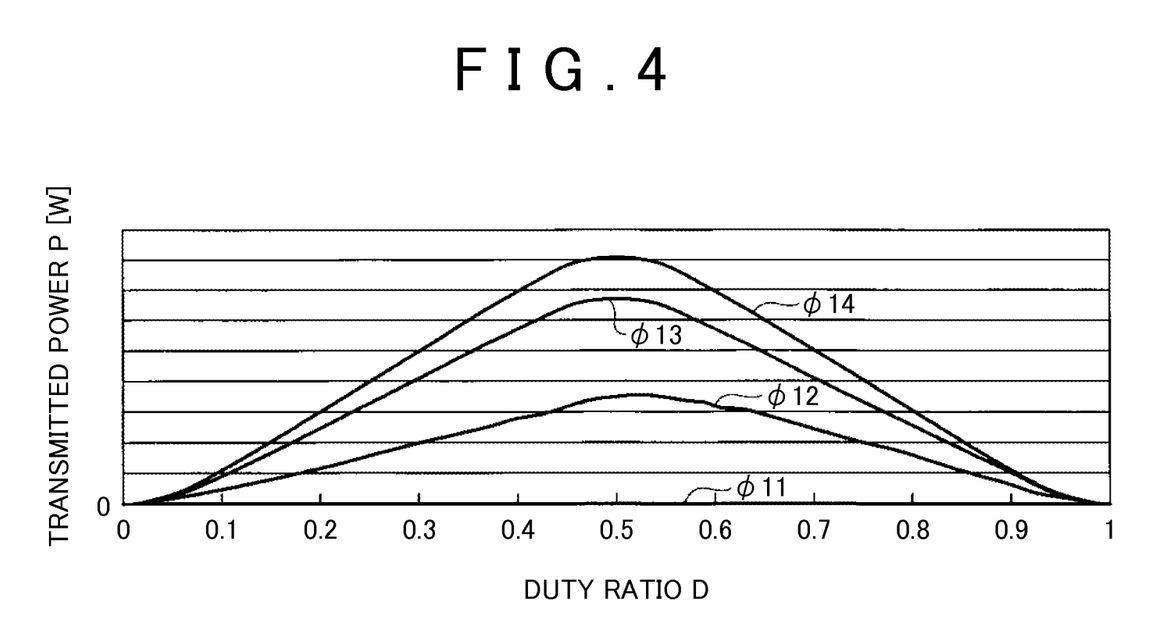
FIG. 4 is a graph showing a relationship among transmitted power P, a phase difference $\phi$, and a duty ratio D.

Incidentally, the transmitted power P is adjusted by changing the phase difference φ by the control unit 50, and is also influenced by the duty ratio D, as shown in Expression 1 and FIG. 4. FIG. 4 is a graph showing the relationship among the transmitted power P, the phase difference φ, and the duty ratio D. The transmitted power P becomes larger as the phase difference φ is increased (φ11<φ12<φ13<φ14). However, even when the phase difference φ is fixed to the same value, the transmitted power P is reduced as the duty ratio D is increased in the case where the duty ratio D is more than 0.5 (=50%), and the transmitted power P is reduced as the duty ratio D is reduced in the case where the duty ratio D is less than 0.5. Note that FIG. 4 is a view showing an example in which the duty ratio D that maximizes the transmitted power P is 50%.

Accordingly, even when the control unit 50 changes a command value φo of the phase difference φ such that the transmitted power P converges to target transmitted power Po, there are cases where it is not possible to adjust the transmitted power P such that the transmitted power P converges to the target transmitted power Po with excellent accuracy depending on a command value Do of the duty ratio D. Similarly, even when the control unit 50 changes the command value φo of the phase difference φ such that the input/output value Y in a predetermined input/output port converges to a target value Yo, there are cases where it is not possible to adjust the input/output value Y such that the input/output value Y converges to the target value Yo with excellent accuracy depending on the command value Do of the duty ratio D.

For example, even when the phase difference φ is set to the upper limit value that maximizes the transmitted power P, in the case where the duty ratio D is not set properly, there is a possibility that the transmitted power P is reduced from the maximum value.

To cope with this, the control unit 50 detects the port voltage Va and the port voltage Vc, and sets the duty ratio D properly in the case where the phase difference φ is the upper limit value. Note that the case where the phase difference φ is the upper limit value denotes a state in which the power supply apparatus 101 attempts to transmit the maximum power (e.g., power shortage of a transmission destination port or the like).

For example, in the case where the phase difference φ is the upper limit value, and a relational expression of (the detected voltage of the port voltage Va)<(the target voltage of the port voltage Vc×(100/α)) is satisfied, the control unit 50 fixes the duty ratio D to α. Note that α is the duty ratio that is more than 0 and less than 100 and is the duty ratio in the case where the transmitted power P is maximized. Note that α may also be the duty ratio in the case where η is maximized. η is the transmission efficiency of the transmitted power P.

In such a case, by fixing the duty ratio D, the effect is obtained that it is possible to prevent the transmitted power P from being reduced from the maximum value.

Herein, the relational expression of (the detected voltage of the port voltage Va)<(the target voltage of the port voltage Vc×(100/α)) and the setting of the duty ratio D will be described by using a specific example. For example, it is assumed that the detected voltage of the port voltage Va=10 V and α=25% are satisfied.

First, consideration will be given to the case of the target voltage of the port voltage Vc=4.0 V.

In this case, the control unit 50 normally has to set the duty ratio D to 40% (=(4.0/10)×100). However, the transmitted power P is maximized when α=25% is satisfied, and hence it is not possible to maximize the transmitted power P or the efficiency η when the duty ratio D is set to 40%.

To cope with this, when the phase difference φ is the upper limit value and the detected voltage of the port voltage Va is less than the product of the target voltage of the port voltage Vc and 100/α, the control unit 50 fixes the duty ratio D to α=25%. Even when the duty ratio D is fixed to α=25%, the detected voltage 2.5 V of the port voltage Vc (=10 V×25%) does not exceed the target voltage (4.0 V) of the port voltage Vc, and the relational expression of (the detected voltage of the port voltage Va)<(the target voltage of the port voltage Vc×100/α) is satisfied (because 10 V<16 V (=4.0×{100/25}) is satisfied).

Consequently, in the case where the above relational expression is satisfied, even when the control unit 50 fixes the duty ratio D to 25%, it is possible to maximize the transmitted power P or the efficiency η without causing a trouble in the circuit (e.g., the second input/output port 60c is brought into an overvoltage state and a load connected to the second input/output port 60c breaks down).

Next, consideration will be given to the case of the target voltage of the port voltage Vc=2.0 V.

In this case, the above relational expression is not satisfied (because 10V>8 V (=2.0×{100/25}) is satisfied), and the detected voltage (2.5 V) of the port voltage Vc exceeds the target voltage (2.0 V) of the port voltage Vc. As a result, the control unit 50 cannot fix the duty ratio D to α=25%.

Consequently, in the case where (the detected voltage of the port voltage Va)≥(the target voltage of the port voltage Vc×100/α) is satisfied, the control unit 50 sets the duty ratio D to a proportional integral derivative (PID) calculated value.

Figure 5:
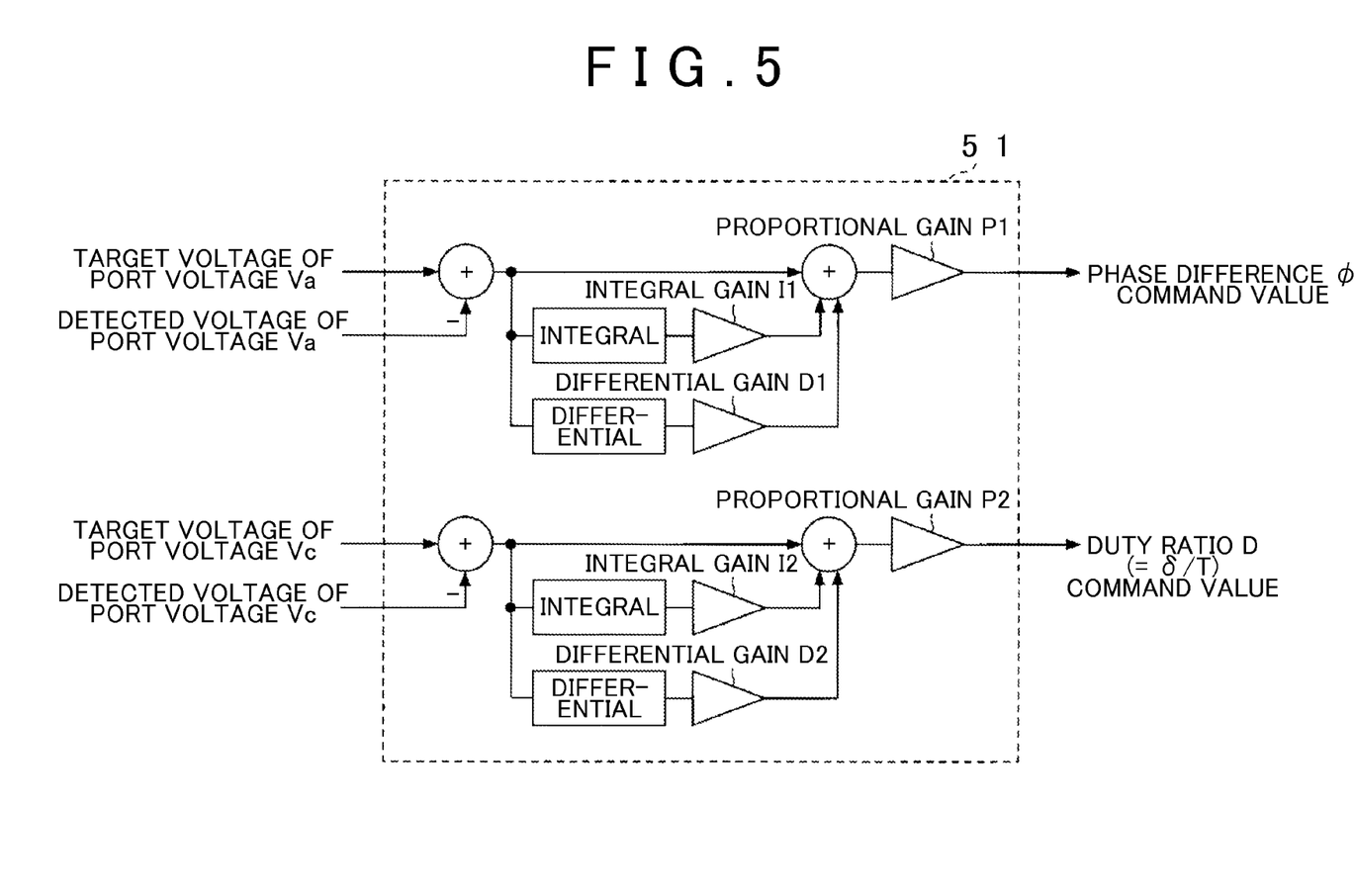
FIG. 5 is a block diagram showing an example of the configuration of the control unit.

FIG. 5 is a block diagram showing an example of the configuration of the control unit 50 that calculates the PID calculated value. The control unit 50 has a PID control unit 51 or the like. The PID calculated value is, e.g., the command value φo of the phase difference φ or the command value Do of the duty ratio D.

The PID control unit 51 has a phase difference command value generation unit that generates the command value φo of the phase difference φ for causing the port voltage of at least one of the primary side ports and the secondary side ports to converge to the target voltage at every switching period T by PID control. For example, the phase difference command value generation unit of the PID control unit 51 generates the command value φo for causing a deviation to converge to zero at every switching period T by performing the PID control based on the deviation between the target voltage of the port voltage Va and the detected voltage of the port voltage Va acquired by the sensor unit 70.

The control unit 50 adjusts the transmitted power P determined by Expression 1 such that the port voltage converges to the target voltage by performing the switching control of the primary side conversion circuit 20 and the secondary side conversion circuit 30 in accordance with the command value φo generated by the PID control unit 51.

In addition, the PID control unit 51 has a duty ratio command value generation unit that generates the command value Do of the duty ratio D for causing the port voltage of at least one of the primary side ports and the secondary side ports to converge to the target voltage at every switching period T by the PID control. For example, the duty ratio command value generation unit of the PID control unit 51 generates the command value Do for causing a deviation to converge to zero at every switching period T by performing the PID control based on the deviation between the target voltage of the port voltage Vc and the detected voltage of the port voltage Vc acquired by the sensor unit 70.

Note that the PID control unit 51 may have an ON time command value generation unit that generates a command value δo of the ON time δ instead of the command value Do of the duty ratio D.

The PID control unit 51 adjusts the command value φo of the phase difference φ based on an integral gain I1, a differential gain D1, and a proportional gain P1, and adjusts the command value Do of the duty ratio D based on an integral gain I2, a differential gain D2, and a proportional gain P2.

Note that the port voltage Va, the port voltage Vc, and the duty ratio D satisfy the relationship of the port voltage Va×the duty ratio D=the port voltage Vc. Consequently, in the case where the port voltage Vc is increased (e.g., from 1 V to 5 V) by reducing the constant port voltage Va (e.g., 10 V), the duty ratio D may be appropriately increased (e.g., from 10% to 50%). Conversely, in the case where the port voltage Va is increased (e.g., from 10 V to 50 V) by increasing the constant port voltage Vc (e.g., 5 V), the duty ratio D may be appropriately reduced (e.g., from 50% to 10%). That is, the PID control unit 51 reverses the control direction of the duty ratio D (the direction of increase/decrease of the duty ratio D) when the operation is switched between the step-up operation and the step-down operation by switching the target to be controlled (the first input/output port 60a or the second input/output port 60c).

Flowchart of Operation of Power Supply Apparatus
101

Figure 6:
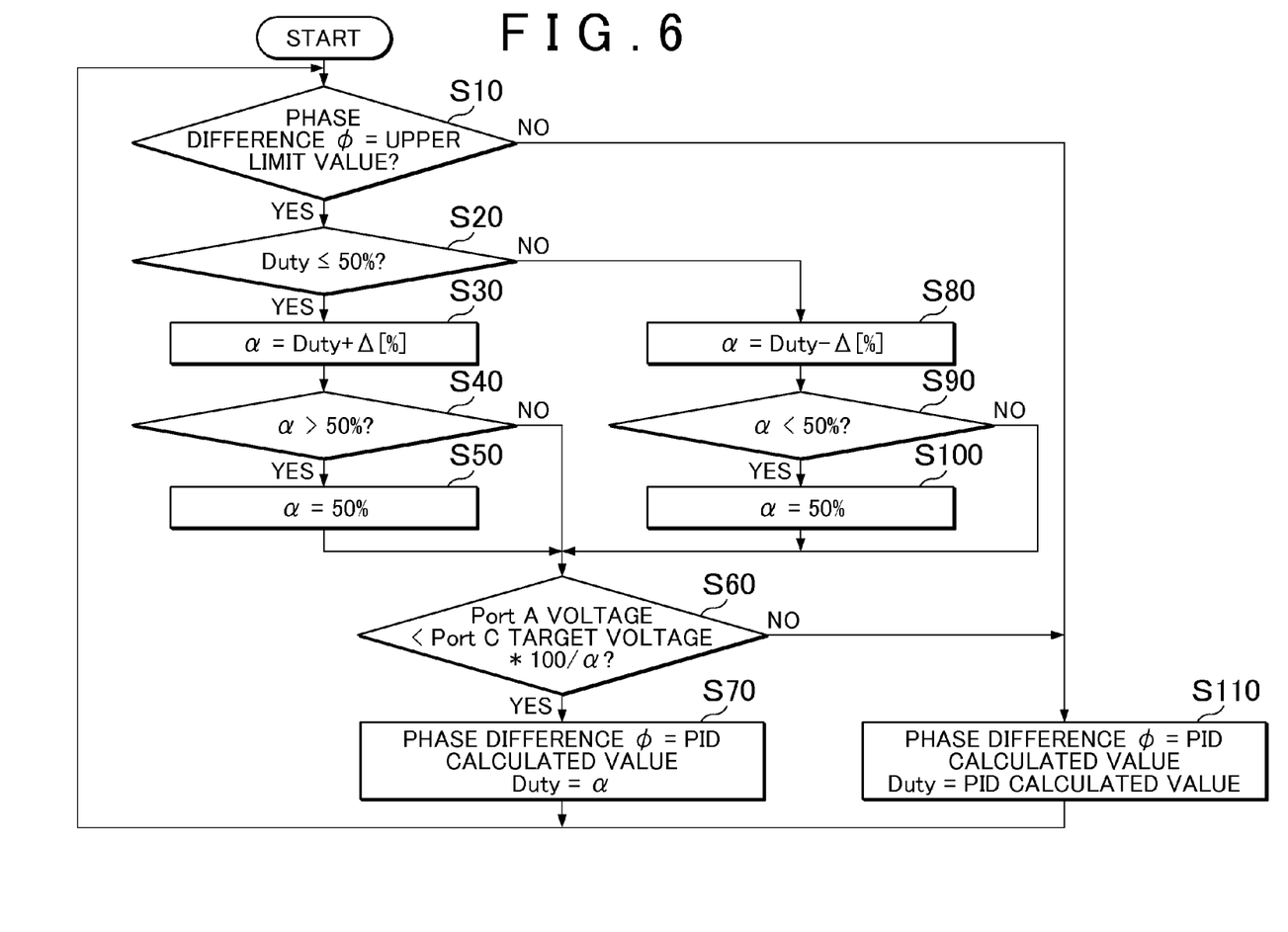
FIG. 6 is a flowchart showing an example of a power conversion method.

FIG. 6 is a flowchart showing an example of a power conversion method. The power conversion method of FIG. 6 is executed by the control unit 50.

In step S10, the control unit 50 determines whether or not the phase difference φ is the upper limit value. When the phase difference φ is the upper limit value (YES), the control unit 50 performs a process in step S20. When the phase difference φ is not the upper limit value (NO), the control unit 50 performs a process in step S110.

With the determination in step S10, the control unit 50 can determine whether or not the phase difference φ is set to the value that maximizes the transmitted power.

In step S20, the control unit 50 determines whether or not the duty ratio D is not more than 50%. When the duty ratio D is not more than 50% (YES), the control unit 50 performs a process in step S30. When the duty ratio D is more than 50% (NO), the control unit 50 performs a process in step S80.

With the determination in step S20, the control unit 50 can determine whether the duty ratio D is to be increased or reduced.

In step S30, the control unit 50 sets a value obtained by adding a variable Δ to the current duty ratio D as α.

In step S40, the control unit 50 determines whether or not α set in step S30 is more than 50%. When α set in step S30 is more than 50% (YES), the control unit 50 performs a process in step S50. When α set in step S30 is not more than 50% (NO), the control unit 50 performs a process in step S60.

With the determination in step S40, the control unit 50 can determine whether or not α set in step S30 is to be forcibly fixed to 50%.

In step S50, the control unit 50 forcible fixes α set in step S30 to 50%.

In step S60, the control unit 50 determines whether or not the detected voltage of the port voltage Va is less than the product of the target voltage of the port voltage Vc and 100/α. When the detected voltage of the port voltage Va is less than the product of the target voltage of the port voltage Vc and 100/α (YES), the control unit 50 performs a process in step S70. When the detected voltage of the port voltage Va is not less than the product of the target voltage of the port voltage Vc and 100/α (NO), the control unit 50 performs the process in step S110. Note that a determination expression in step S60 is derived from the relational expression of the port voltage Va×the duty ratio D=the port voltage Vc.

With the determination in step S60, the control unit 50 can compare the detected voltage of the port voltage Va with the target voltage of the port voltage Vc to thereby determine whether the duty ratio D is to be set to the fixed value (α) or the PID calculated value.

In step S70, the control unit 50 sets the phase difference φ to the PID calculated value and sets the duty ratio D to α, and returns to step S10 again.

In step S80, the control unit 50 sets a value obtained by subtracting the variable Δ from the current duty ratio D as α.

In step S90, the control unit 50 determines whether or not α set in step S80 is less than 50%. When α set in step S80 is less than 50% (YES), the control unit 50 performs a process in step S100. When α set in step S80 is not less than 50% (NO), the control unit 50 performs the process in step S60.

With the determination in step S90, the control unit 50 can determine whether or not α set in step S80 is to be forcible fixed to 50%.

In step S100, the control unit 50 forcibly fixes α set in step S80 to 50%.

In step S110, the control unit 50 sets the phase difference φ to the PID calculated value and sets the duty ratio D to the PID calculated value, and returns to step S10 again. The control unit 50 continues the control even in a state in which the duty ratio D is less than 50% or a state in which the duty ratio D is more than 50%.

As described above, the control unit 50 determines whether or not the phase difference φ is the upper limit value with the control in step S10, increases or reduces a with the control in step S20, determines whether or not α is to be forcibly fixed with the control from step S30 to step S50 and the control from step S80 to step S100, and determines the magnitude relationship among the detected voltage of the port voltage Va, the target voltage of the port voltage Vc, and a with the control in step S60.

The control unit 50 sets the duty ratio D properly based on the determination results, and maximizes the transmitted power or the efficiency.

The power conversion device and the power conversion method have been described thus far based on the embodiment, but the invention is not limited to the above embodiment. Various changes and modifications such as combinations and replacements of a part or all of other embodiments can be made without departing from the scope of the invention.

For example, in the above embodiment, the MOSFET as a semiconductor device that performs the ON/OFF operation has been described as the example of the switching element. However, the switching element may also be, e.g., a voltage-controlled power device using an insulated gate such as an insulated gate bipolar transistor (IGBT) or the MOSFET, or a bipolar transistor.

In addition, a power supply may be connected to the fourth input/output port 60*d*.

Further, the secondary side may be defined as the primary side, and the primary side may be determined as the secondary side.

Furthermore, the invention can be applied to the power conversion device that has at least three or more input/output ports and is capable of power conversion between any two input/output ports among at least three or more input/output ports. For example, the invention can be applied to the power supply apparatus that has a configuration in which any one of the four input/output ports shown in FIG. 1 is not provided.

What is claimed is:

1. A power conversion method of a power conversion device including a plurality of primary side ports disposed in a primary side circuit and a secondary side port disposed in a secondary side circuit magnetically coupled to the primary side circuit with a transformer, the power conversion device adjusting transmitted power by changing a phase difference between switching of the primary side circuit and switching of the secondary side circuit, the transmitted power being transmitted between the primary side circuit and the secondary side circuit and adjusted, and a first duty ratio of the switching of the primary side circuit or a second duty ratio of the switching of the secondary side circuit being changed, comprising:

determining whether the phase difference is an upper limit value;

determining whether a detected voltage of a first primary side port is less than a product of a target voltage of a second primary side port and 100/a third duty ratio, the third duty ratio being more than 0 and less than 100, the third duty ratio being the first duty ratio of the switching of the primary side circuit when the transmitted power is maximized or the second duty ratio of the switching of the secondary side circuit when the transmitted power is maximized; and fixing the first duty ratio or the second duty ratio to the third duty ratio when the phase difference is the upper limit value and the detected voltage of the first primary side port is less than the product of the target voltage of the second primary side port and 100/the third duty ratio.

2. The power conversion method according to claim 1, further comprising:

determining whether the first duty ratio or the second duty ratio is not more than 50%;

increasing the third duty ratio when the first duty ratio or the second duty ratio is not more than 50%;

determining whether the increased third duty ratio is more than 50%; and determining whether the detected voltage of the first primary side port is less than the product of the target voltage of the second primary side port and 100/the third duty ratio when the increased third duty ratio is not more than 50%.

3. The power conversion method according to claim 2, further comprising:

fixing the increased third duty ratio to 50% when the increased third duty ratio is more than 50%.

4. The power conversion method according to claim 1, further comprising:

determining whether the first duty ratio or the second duty ratio is not more than 50%;

reducing the third duty ratio when the first duty ratio or the second duty ratio is more than 50%;

determining whether the reduced third duty ratio is less than 50%; and determining whether the detected voltage of the first primary side port is less than the product of the target voltage of the second primary side port and 100/the third duty ratio when the reduced third duty ratio is not less than 50%.

5. The power conversion method according to claim 4, further comprising:

fixing the reduced third duty ratio to 50% when the reduced third duty ratio is less than 50%.

6. The power conversion method according to claim 1, wherein the third duty ratio is a duty ratio when a transmission efficiency of the transmitted power is maximized.

7. The power conversion method according to claim 1, wherein the third duty ratio is a PID calculated value.

8. A power conversion device comprising:

a primary side circuit including a plurality of primary side ports;

a secondary side circuit including a secondary side port and magnetically coupled to the primary side circuit with a transformer; and a control unit configured to control transmitted power transmitted between the primary side circuit and the secondary side circuit by changing a phase difference between switching of the primary side circuit and switching of the secondary side circuit, and also control a first duty ratio of the switching of the primary side circuit or a second duty ratio of the switching of the secondary side circuit, wherein the control unit determines whether the phase difference is an upper limit value, the control unit determines whether a detected voltage of a first primary side port is less than a product of a target voltage of a second primary side port and 100/a third duty ratio, the third duty ratio being more than 0 and less than 100, the third duty ratio being the first duty ratio of the switching of the primary side circuit when the transmitted power is maximized or the second duty ratio of the switching of the secondary side circuit when the transmitted power is maximized, and the control unit fixes the first duty ratio or the second duty ratio to the third duty ratio when the phase difference is the upper limit value and the detected voltage of the first primary side port is less than the product of the target voltage of the second primary side port and 100/the third duty ratio.

9. The power conversion device according to claim 8, wherein the control unit determines whether the first duty ratio or the second duty ratio is not more than 50%, the control unit increases the third duty ratio when the first duty ratio or the second duty ratio is not more than 50%, the control unit determines whether the increased third duty ratio is more than 50%, and the control unit determines whether the detected voltage of the first primary side port is less than the product of the target voltage of the second primary side port and 100/the third duty ratio when the increased third duty ratio is not more than 50%.

10. The power conversion device according to claim 9, wherein the control unit fixes the increased third duty ratio to 50% when the increased third duty ratio is more than 50%.

11. The power conversion device according to claim 8, wherein the control unit determines whether the first duty ratio or the second duty ratio is not more than 50%, the control unit reduces the third duty ratio when the first duty ratio or the second duty ratio is more than 50%, the control unit determines whether the reduced third duty ratio is less than 50%, and the control unit determines whether the detected voltage of the first primary side port is less than the product of the target voltage of the second primary side port and 100/the third duty ratio when the reduced third duty ratio is not less than 50%.

12. The power conversion device according to claim 11, wherein the control unit fixes the reduced third duty ratio to 50% when the reduced third duty ratio is less than 50%.

13. The power conversion device according to claim 8, wherein the third duty ratio is a duty ratio when a transmission efficiency of the transmitted power is maximized.

14. The power conversion device according to claim 8, wherein the third duty ratio is a PID calculated value.

* * * * *

UNITED STATES PATENT AND TRADEMARK OFFICE
CERTIFICATE OF CORRECTION

PATENT NO. : 9,780,679 B2
APPLICATION NO. : 14/625726
DATED : October 3, 2017
INVENTOR(S) : Takahiro Hirano et al.

Page 1 of 1

It is certified that error appears in the above-identified patent and that said Letters Patent is hereby corrected as shown below:

At Column 4, Line 12, change "upper atm V1," to "upper arm V1,"

At Column 12, Line 41, change "to cause, each" to "to cause each"

At Column 13, Line 03, change "30. π is a switching" to "30. f is a switching"

At Column 13, Line 30, change "……+$L_{r2}$ (1-$k_T^2$)…" to "……+$L_{T2}$ (1-$k_T^2$)…"

At Column 14, Line 29, change "that a may" to "that α may"

At Column 16, Line 65, change "variable A from" to "variable Δ from"

At Column 17, Line 19, change "reduces a with" to "reduces α with"

Signed and Sealed this
Ninth Day of October, 2018

Andrei Iancu
*Director of the United States Patent and Trademark Office*